United States Patent
Abood et al.

(10) Patent No.: US 6,985,579 B2
(45) Date of Patent: Jan. 10, 2006

(54) PORTABLE COMMUNICATION DEVICE HAVING AN OUTPUT UNIT POSITIONABLE AND ROTATABLE WITH RESPECT TO AN INPUT UNIT

(75) Inventors: Souhail N. Abood, San Diego, CA (US); Dietmar F. Wennemer, San Diego, CA (US)

(73) Assignee: Siemens Communications, Inc., Boca Raton, FL (US)

(*) Notice: Subject to any disclaimer, the term of this patent is extended or adjusted under 35 U.S.C. 154(b) by 509 days.

(21) Appl. No.: 09/966,537

(22) Filed: Sep. 26, 2001

(65) Prior Publication Data

US 2003/0060226 A1 Mar. 27, 2003

(51) Int. Cl.
*H04M 1/00* (2006.01)

(52) U.S. Cl. .............................. 379/433.13; 379/433.04

(58) Field of Classification Search ........... 379/433.13, 379/433.04; 455/575.1, 90.3, 90.1; 345/164; 361/686

See application file for complete search history.

(56) References Cited

U.S. PATENT DOCUMENTS

| | | | |
|---|---|---|---|
| 5,548,477 A | 8/1996 | Kumar et al. | |
| 5,644,471 A * | 7/1997 | Schultz et al. | 361/686 |
| 5,696,496 A | 12/1997 | Kumar | |
| 6,658,272 B1 * | 12/2003 | Lenchik et al. | 345/164 |
| 6,665,173 B2 | 12/2003 | Brandenberg et al. | |
| 2002/0102946 A1 * | 8/2002 | SanGiovanni | 455/575.1 |

FOREIGN PATENT DOCUMENTS

DE 33 23 858 A1 1/1985

OTHER PUBLICATIONS

"PaceBook Technology: Features".
"Vista: Organized Simplicity in a Compact Package," royal.com.
Phil Askey, "Minolta Dimage EX 1500 Review,"(Jan. 1999).
"The Compaq SLT/286," networkgeek.com (1987).

* cited by examiner

*Primary Examiner*—Jack Chiang (57) ABSTRACT

A portable communication device, such as a personal digital assistant or wireless telephone, is disclosed. According to one embodiment, the portable communication device includes an input unit having a first coupling portion and an output unit having a second coupling portion. The first and second coupling portions are adapted such that the output unit is positionable with respect to the input unit. In addition, the output unit is rotatable about at least a first axis and a second axis.

18 Claims, 7 Drawing Sheets

PORTABLE COMMUNICATION DEVICE HAVING AN OUTPUT UNIT POSITIONABLE AND ROTATABLE WITH RESPECT TO AN INPUT UNIT

BACKGROUND OF THE INVENTION

The present invention relates to portable communication devices. In particular, the present invention relates to portable communication devices having an output unit that is positionable and rotatable with respect to an input unit.

People frequently want to adjust the position of a portable communication device, such as a Personal Digital Assistant (PDA) or a wireless telephone. For example, a user may want to adjust the position of a portable communication device to facilitate an input of information into the device. In the case of a PDA, a user may want to position the PDA so that he or she can easily use a keypad. As another example, a user may want to position a wireless telephone so that he or she can speak into a microphone or so that the wireless telephone is able to transmit a signal to another device (e.g., a device associated with a cellular telephone service provider). As still another example, a user may want to adjust the angle of a digital camera lens associated with a PDA when taking a digital picture.

Similarly, a user may want to adjust the position of a portable communication device to facilitate an output of information from the device. For example, a user may want to adjust the position of a PDA or wireless telephone to improve the visibility of a display screen (e.g., by reducing glare). As another example, a user may want to adjust the position of a wireless telephone to better hear sound from a speaker.

Users may also want to adjust the position of a portable communication device for other reasons. For example, a user may prefer to not position a wireless telephone's antenna too close to his or her head (due to a fear of potential harmful effects that may result from energy radiated by the antenna).

Note that a user may want to position a portable communication device one particular way to facilitate an input of information and another way to facilitate an output of information. For example, a user may want to place a PDA's keypad at one angle and the PDA's display screen at another angle. Similarly, a user may want to point a digital camera lens associated with a wireless telephone in one direction while pointing the telephone's display screen in another direction. As still another example, a user may want to separately position a wireless telephone's microphone and speaker (e.g., in accordance with his or her physical characteristics).

Some portable communication devices have a "clamshell" design that lets a user rotate, for example, a display screen only about a single axis with respect to a keypad. Similarly, some wireless telephones open to let a user rotate a speaker about a single axis with respect to a microphone. This approach, however, provides a user with only a very limited ability to position parts of the portable communication device (e.g., parts of the device typically can only rotate about a single axis).

Other designs let a user move and/or rotate a first part with respect to a second part. For example, a PDA may be connected to a keyboard by a wire or cable, or a headset may be connected to a wireless telephone by a wire or cable. In some cases, the first and second parts communicate wirelessly (e.g., a laptop's keyboard may wirelessly communicate with a display screen). In either case, although the parts are independently movable, the portable communication device will not maintain a position selected by the user. As a result, the user needs to maintain a desired position in some other way (e.g., by balancing the keyboard on his or her lap), which can be awkward and inconvenient.

SUMMARY OF THE INVENTION

To alleviate problems inherent in the prior art, the present invention introduces portable communication devices having an output unit that is positionable and rotatable with respect to an input unit.

According to one embodiment, a portable communication device has an input unit, adapted to receive information, including a first coupling portion. The portable communication device also has an output unit, adapted to provide information, including a second coupling portion. The first and second coupling portions are adapted such that the output unit is: (i) positionable with respect to the input unit, and (ii) rotatable about at least a first axis and a second axis.

According to another embodiment, a PDA has a keypad unit including a first power device and a first coupling portion. The PDA also has a display unit including a second power device and a second coupling portion. At least one of the first and second coupling portions include a joint adapted such that the display unit is: (i) positionable with respect to the keypad unit, and (ii) rotatable about a first axis, a second axis, and a third axis. The display unit is also removable from the keypad unit, and the keypad unit and the display unit communicate wirelessly when removed from each other. The PDA also includes a charging device adapted to charge the first and second power devices when coupled to one of the keypad unit and the display unit.

According to another embodiment, a portable communication device has an input unit, adapted to receive information, including a first coupling portion. The portable communication device also has an output unit, adapted to provide information, including a second coupling portion. The first and second coupling portions are adapted such that the input unit is: (i) positionable with respect to the output unit, and (ii) rotatable about at least a first axis and a second axis.

Still another embodiment is directed to an input unit for a portable communication device. The input unit includes an input portion adapted to receive information and a first coupling portion. The first coupling portion is adapted to work with a second coupling portion associated with an output unit such that the output unit is: (i) positionable with respect to the input unit, and (ii) rotatable about at least a first axis and a second axis.

Yet another embodiment is directed to an output unit for a portable communication device. The output unit includes an output portion adapted to provide information and a first coupling portion. The first coupling portion is adapted to work with a second coupling portion associated with an input unit such that the output unit is: (i) positionable with respect to the input unit, and (ii) rotatable about at least a first axis and a second axis.

One embodiment comprises: an input unit adapted to receive information; an output unit adapted to provide information; and detachable coupling means for allowing the output unit to be: (i) positionable with respect to the input unit, and (ii) rotatable about at least a first axis and a second axis.

With these and other advantages and features of the invention that will become hereinafter apparent, the invention may be more clearly understood by reference to the following detailed description of the invention, the appended claims, and the drawings attached herein.

DETAILED DESCRIPTION OF SPECIFIC EMBODIMENTS

Embodiments of the present invention are directed to portable communication devices. As used herein, the phrase "portable communication device" may refer to any communication device that is typically moved around by a user. A portable communication device may be, for example, a PDA (e.g., a PALM VII® PDA) or laptop computer, a wireless or cordless telephone, or a two-way pager (e.g., a BLACK-BERRY® handheld wireless electronic mail device).

Moreover, embodiments of the present invention are directed to portable communication devices with input and/or output units that are "positionable" by a user. That is, the input or output unit will tend to remain in a position selected by the user.

Figure 1:
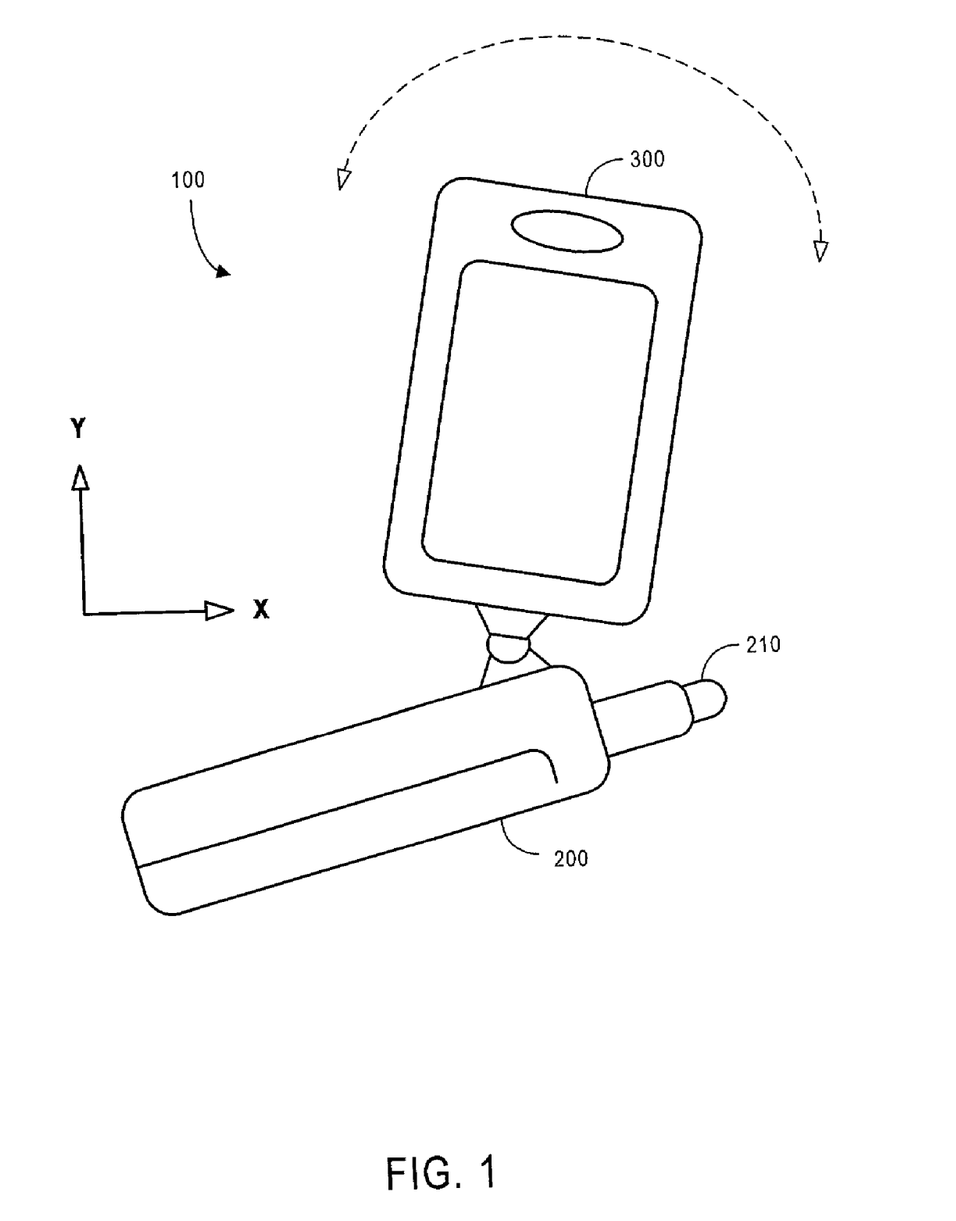
FIGS. 1 and 2 illustrate a portable communication device according to some embodiments of the present invention.

FIG. 1 illustrates a portable communication device 100 (e.g., a PDA) according to some embodiments of the present invention. The portable communication device 100 includes an input unit 200 adapted to receive information. The input unit 200 may, for example, receive information via a keyboard or keypad, a digital camera lens (e.g., adapted to capture moving or still images), a scanner (e.g., adapted to record business cards or other documents), and/or a microphone. The input unit 200 may also receive information, for example, via a thermometer or a communication device, such as an Infrared Radiation (IR) receiver.

The portable communication device 100 also includes an output unit 300 adapted to provide information. The output unit 300 may, for example, provide information via a display screen such as a Liquid Crystal Display (LCD) display screen. The output unit 300 may also provide information, for example, via a speaker, a printer, a tactile device (e.g., a vibrating device), and/or a communication device (e.g., an IR transmitter).

Although it is adapted to receive information, the input unit 200 may also provide some information. For example, the input unit 200 may include an Light Emitting Diode (LED) that indicates when power is being applied. As shown in FIG. 1, the input unit 200 can also include an antenna 210 that may be used to exchange information with other devices (including a telephone or data network) and/or to exchange information between the input unit 200 and the output unit 300. Also note that, the output unit 300 can similarly receive some information. For example, a user may adjust a display screen's settings or indicate that he or she wants to capture a particular image via the output unit 300.

As can be seen in FIG. 1, the input unit 200 and the output unit 300 are attached via a coupling (e.g., a first coupling portion on the input unit 200 may attach to a second coupling portion on the output unit 300). The coupling may comprise, for example, a single pivot point such as a ball-and-socket joint.

According to one embodiment of the present invention, the coupling allows the output unit 300 be positioned with respect to the input unit 200. That is, a user may place the output unit 300 in a position with respect to the input unit 200, and the output unit 300 will tend to remain in that position. Note that the output unit 300 may move smoothly between positions or may instead be positionable in discrete steps. Of course, the coupling also allows the input unit 200 be positioned with respect to the output unit 200.

Figure 2:
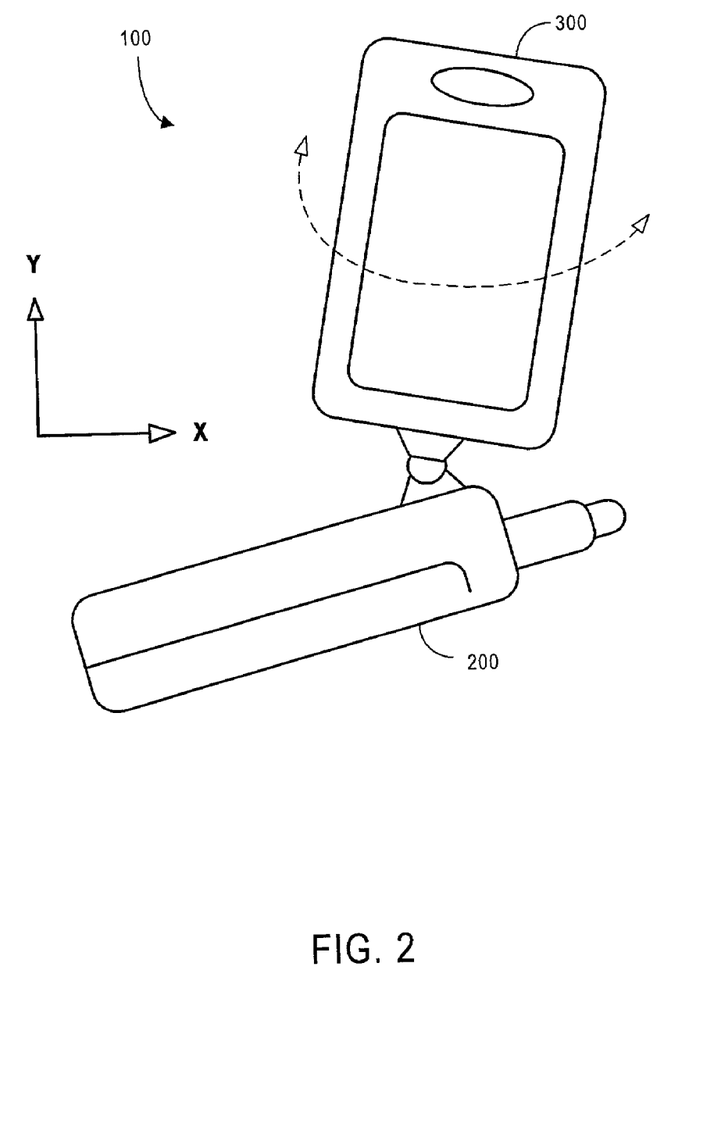

The coupling also lets the output unit 300 (and/or the input unit 200) be rotated about at least a first axis and a second axis. For example, the dashed arrow in FIG. 1 represents the rotation of the output unit 300 about a first axis (i.e., a "Z" axis directed out of the drawing). FIG. 2 illustrates the output unit 300 rotating about a second axis (i.e., the "Y" axis). According to some embodiments, the output unit 300 can also be rotated about a third axis (ie., the "X" axis). Of course, the rotation about a particular axis can be done with respect to an angle relative to that axis in some embodiments.

Figure 3:
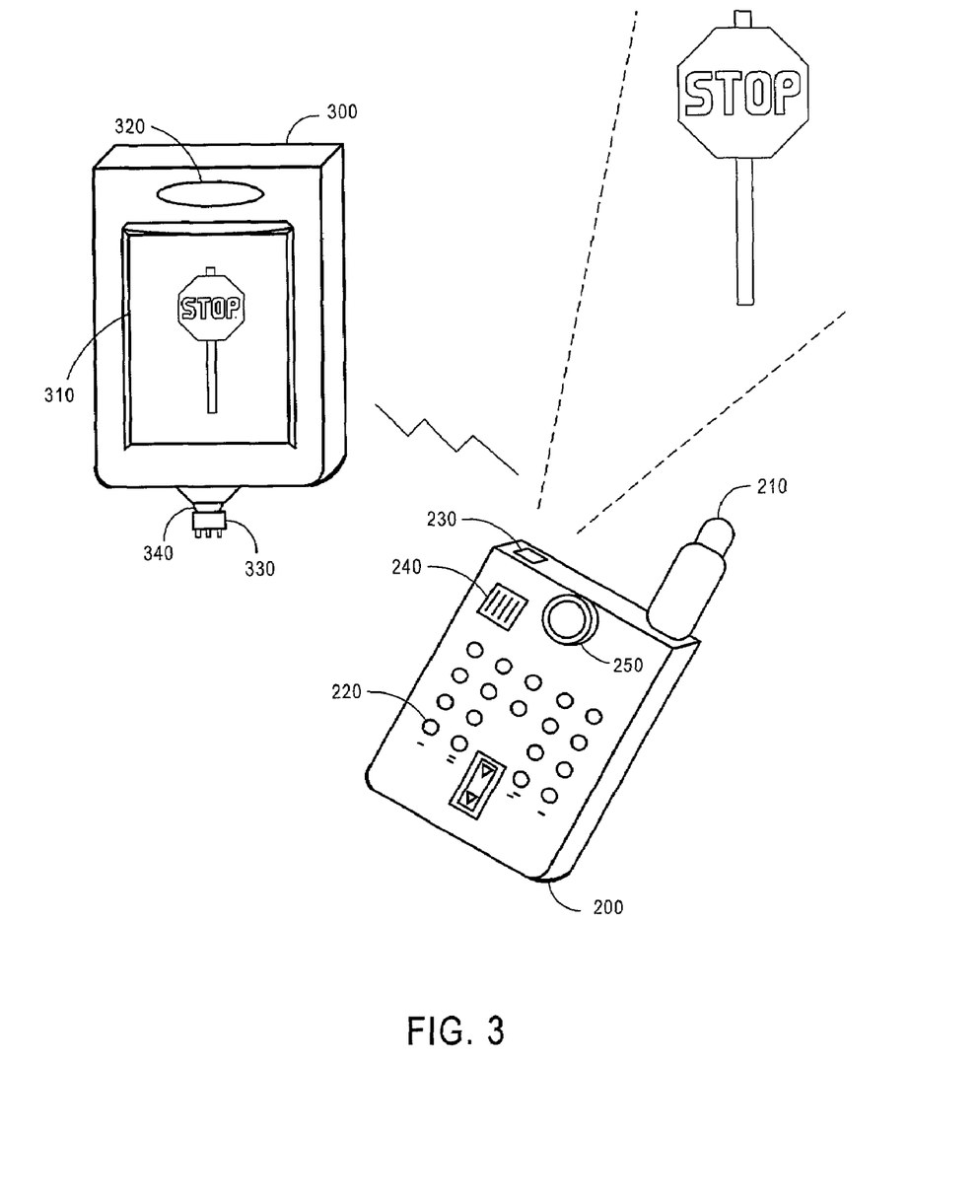
FIG. 3 illustrates an output unit removed from an input unit in accordance with some embodiments of the present invention.

FIG. 3 illustrates a portable communication device 100 when the output unit 300 is physically removed from the input unit 200 in accordance with some specific embodiments of the present invention. For example, a user may pull the output unit 300 away from the input unit 200 to detach a connector, such as a plastic connector.

According to this embodiment, the input unit 200 and the output unit 300 still communicate with each other when separated. For example, the input unit 200 (e.g., via the antenna 210) and the output unit 300 (which would have some type of an antenna, either internal or external, as well) may communicate via a wireless protocol such as an Institute of Electrical and Electronics Engineers (IEEE) 802.11 network, an IR network, or an Internet Protocol (IP) network such as the Internet, an intranet or an extranet. In some embodiments, the input unit 200 and the output unit 300 communicate via Bluetooth technology, which allows a wide range of computing and telecommunication devices to be interconnected via wireless connections. Specifications and other information regarding Bluetooth technology are available at the Bluetooth Web site: www.bluetooth.com. In embodiments utilizing Bluetooth technology, communicating devices may be equipped with a microchip transceiver that transmits and receives information in a frequency band of about 2.45 GHz (with some variation of bandwidth in different countries). Connections are typically maintained up to a maximum range, such as ten meters.

As a result, the user may input information into the portable communication device 100 via keypad buttons 220, a digital camera lens 230, and a microphone 240. The user may also receive information from the portable communication device 100 via a display screen 310 and a speaker 320. For example, as illustrated in FIG. 3, the display screen 310 can show an image of an object, such as a stop sign, that is being recorded by the digital camera lens 230.

According to one embodiment, the input unit 200 and the output unit 300 always communicate with each other wirelessly. In this case, no conductive communication path between the input unit 200 and the output unit 300 is needed—even when the units are attached.

According to another embodiment, the input unit 200 and the output unit 300 communicate with each other wirelessly when the units are separated, and via a conductive communication path when the units are attached. For example, the output unit 300 may have a socket 330 with electrical contact areas (e.g., six spring contacts) on a coupling. The coupling could then be attached to a coupling 250 on the input unit 200 to complete the conductive communication path. Note that the output unit 300 coupling portion may also include a positionable and rotatable portion 340 (e.g., a ball joint) between the socket 330 and an output portion (e.g., the display screen 310). In this way, the output portion can be rotated without moving the electrical contact areas. Of course, the socket may be equipped on input unit 200 with a coupling equipped on output unit 300 in other embodiments.

According to another embodiment (not shown in FIG. 3), the input unit 200 instead has a socket with electrical contact areas and a ball joint between the socket and an input portion (e.g., the keypad buttons 220). Of course, alternatively the output unit 300 may instead have a socket with electrical contact areas and a ball joint between the socket and the body of output unit 300.

Because the output unit 300 can be removed from the input unit 200, it is possible that a user may misplace one of the units. In this case, the user may, according to one embodiment, activate a button on one unit to determine information associated with the location of the other unit. For example, the output unit 300 may emit a sound when a button on the input unit 200 is activated.

Figure 4:
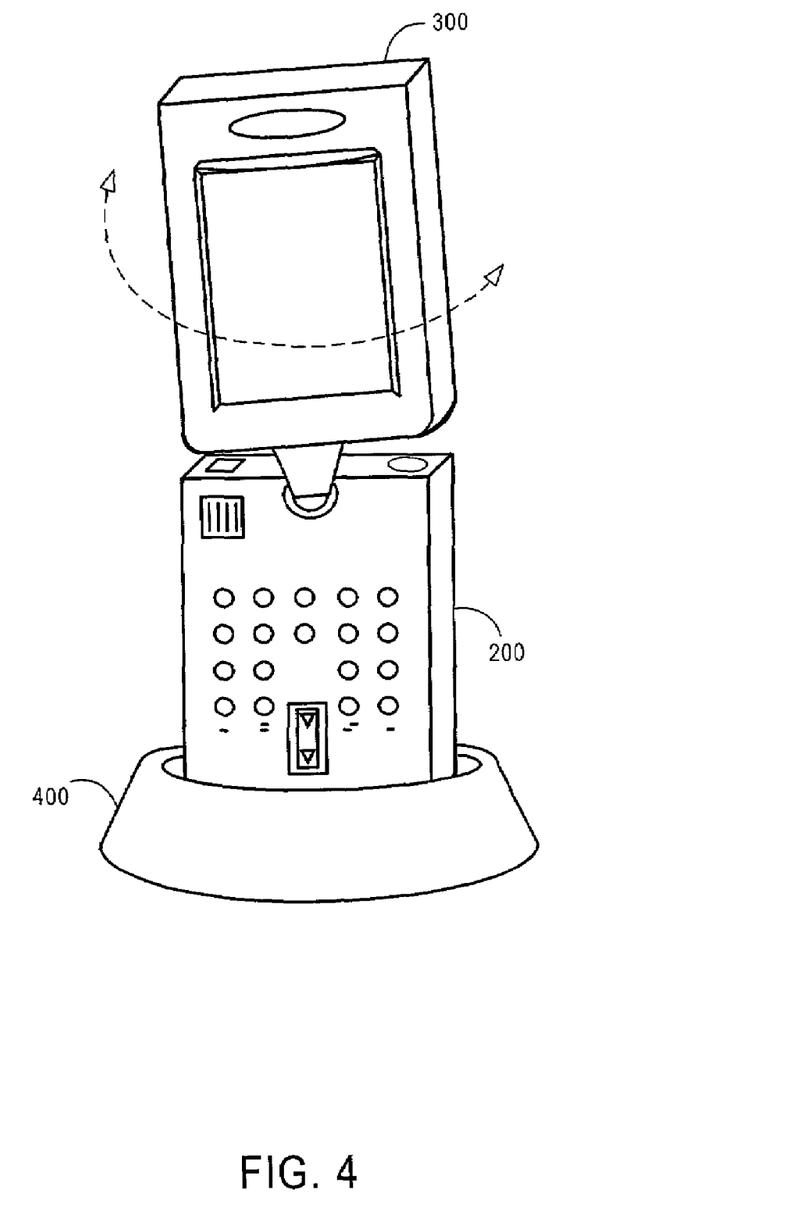
FIG. 4 illustrates a portable communication device placed in a docking device in accordance with some embodiments of the present invention.

FIG. 4 illustrates the portable communication device 100 placed in a docking device 400 in accordance with some embodiments of the present invention. Note that FIG. 4 also illustrates how the output portion 300 can be rotated about a third axis (i.e., in addition to the rotations illustrated in FIGS. 1 and 2) in accordance with some embodiments of the present invention.

The docking device 400 may be, for example, a charging device adapted to charge power devices (batteries) in both the input unit 200 and the output unit 300. In this case, power from the docking device 400 may be supplied to the output unit 300 via the input unit 200. Of course, power could instead be supplied to the input unit 200 via the output unit 300. According to still other embodiments, a docking device 400 may instead attach to both the input unit 200 and the output unit 300—or separate docking devices 400 may be provided for each of the units.

According to other embodiments, the docking device 400 is a communication device adapted to exchange information between the portable communication device 100 and another device. For example, information may be exchanged between the portable communication device 100 and a Personal Computer (PC) via the docking device 400 and a Universal Serial Bus (USB) port.

Figure 5:
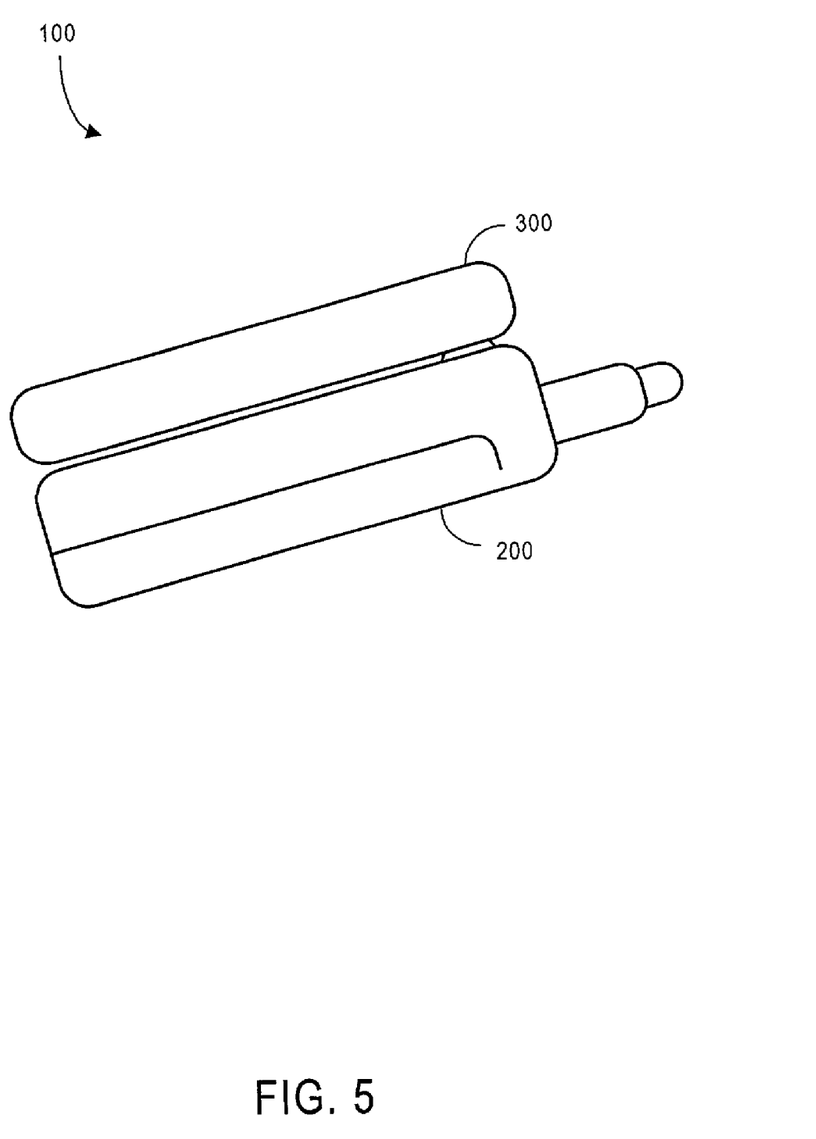
FIG. 5 illustrates a portable communication device in a closed position in accordance with some embodiments of the present invention.

FIG. 5 illustrates a portable communication device 100 in a closed position in accordance with some embodiments of the present invention. In addition to reducing overall size of the portable communication device 100, closing the device may protect the input unit 200 (e.g., by preventing keypad buttons from being inadvertently activated) and/or the output unit 300 (e.g., by preventing a delicate display screen from being scratched).

Additional Embodiments

The following illustrates various additional embodiments of the present invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 6:
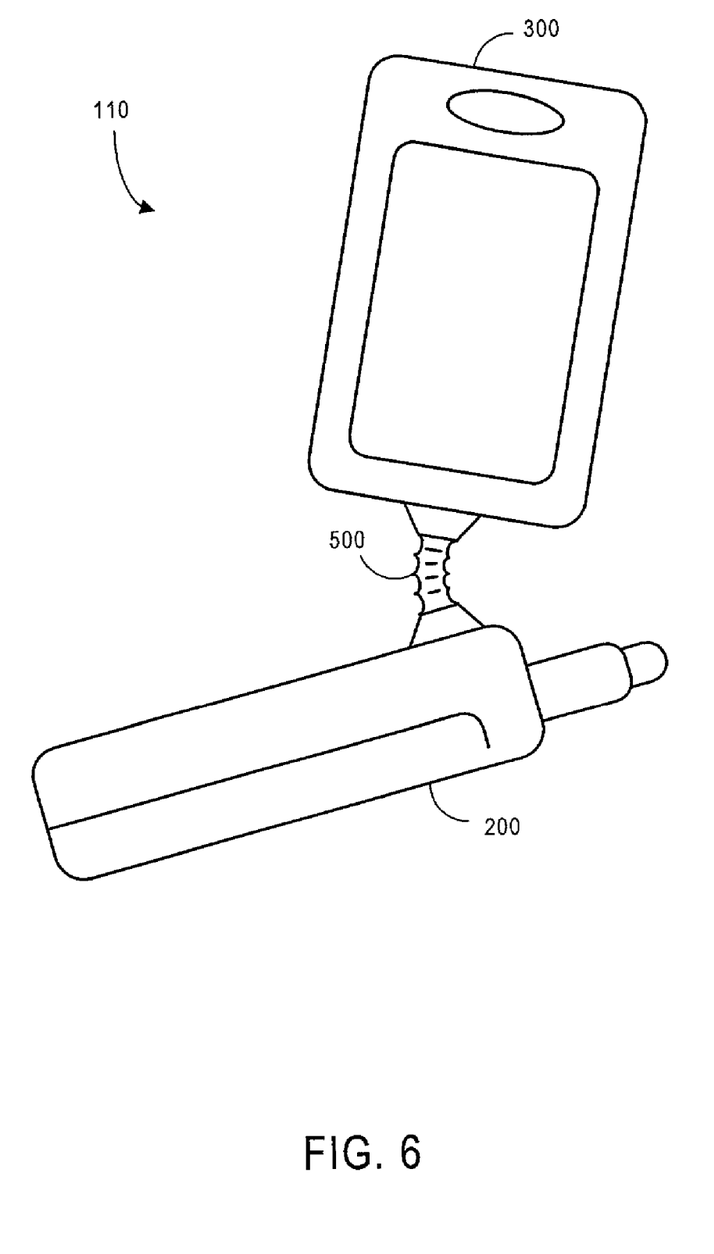
FIG. 6 illustrates a portable communication device with a bendable portion according to still another embodiment of the present invention.
Figure 7:
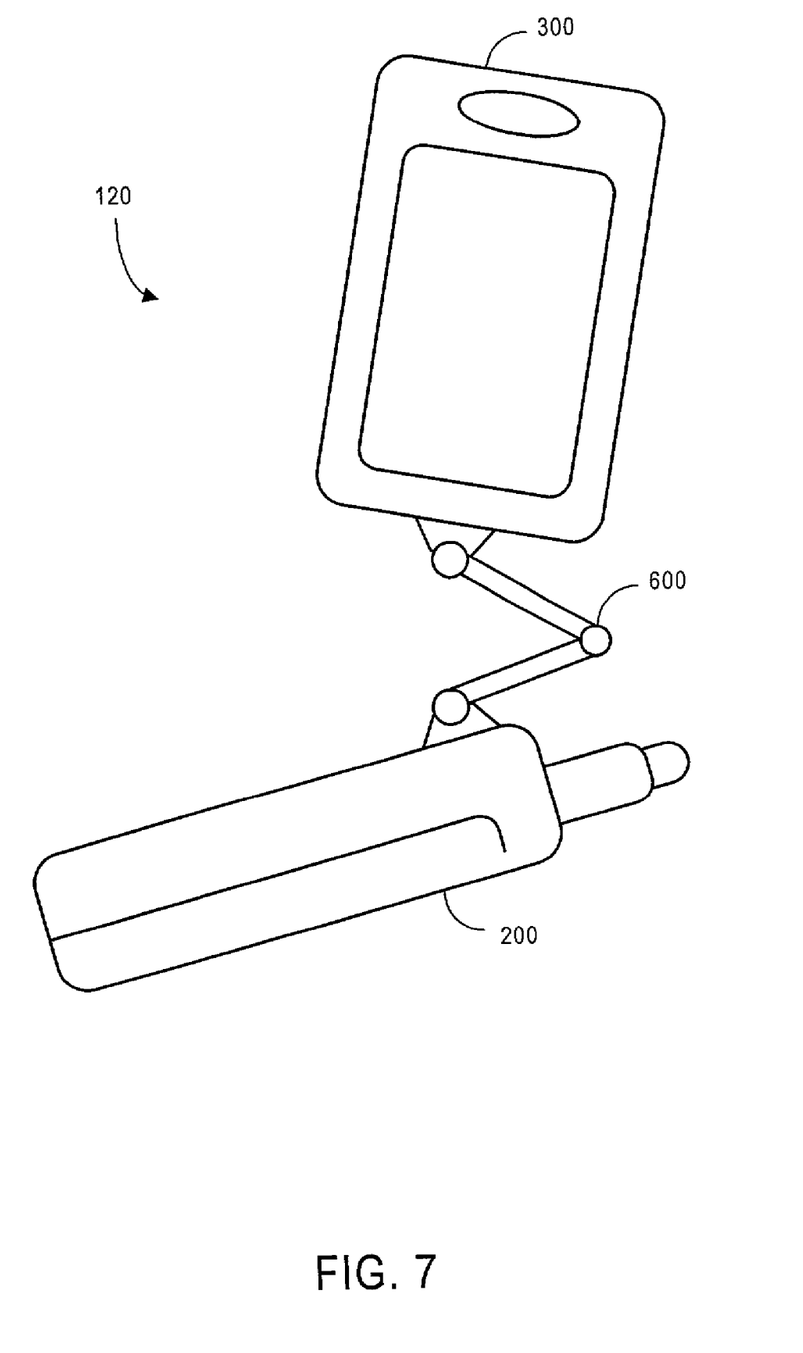
FIG. 7 illustrates a portable communication device with an arm portion according to yet another embodiment of the present invention.

In particular, the present invention can incorporate types of couplings other than those described in detail above. For example, FIG. 6 illustrates a portable communication device 110 having a bendable portion 500 according to another embodiment of the present invention. Similarly, FIG. 7 illustrates a portable communication device 120 having an arm portion 600 in addition to joints according to yet another embodiment of the present invention. In either case, the input unit 200 and output unit 300 may be positionable, rotatable (e.g., about a first, a second, and/or a third axis), and/or detachable.

Moreover, although embodiments described herein illustrate portable communication devices 100 with only a single input unit 200 and output unit 300, the present invention can be used with respect to portable communication devices 100 having a plurality of input units 200 and/or a plurality of output units 300.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A portable communication device, comprising:
an input unit adapted to receive information and including a first coupling portion; and
an output unit adapted to provide information, communicate at least with the input device, and including a second coupling portion,
wherein the first and second coupling portions are selectively connectable and when selectively connected to each other (i) provide a connection that selectively positions the output unit at a plurality of positions with respect to the input unit, and is rotatable about at least a first axis and a second axis, and (ii) the output unit communicates with at least the input unit wirelessly.

2. The portable communication device of claim 1, wherein the input unit is further rotatable about a third axis.

3. The portable communication device of claim 1, wherein the first and second coupling portions comprise a single pivot point.

4. The portable communication device of claim 3, wherein the first and second coupling portions comprise a ball joint.

5. The portable communication device of claim 4, wherein the output unit is closable with respect to the input unit.

6. The portable communication device of claim 4, wherein the output unit is conductively coupled to the input unit.

7. The portable communication device of claim 6, wherein the output unit is conductively coupled to the input unit via at least one spring contact.

8. The portable communication device of claim 4, wherein the output unit is removable from the input unit.

9. The portable communication device of claim 4, wherein the portable communication device comprises at least one of: (i) a portable digital assistant, (ii) a wireless telephone, (iii) a two-way pager.

10. The portable communication device of claim 4, wherein the input unit includes at least one of: (i) a keyboard, (ii) a keypad, (iii) a digital camera lens, (iv) a digital video camera lens, (v) a scanner, (vi) a thermometer, (vii) a microphone, and (viii) a communication device.

11. The portable communication device of claim 4, wherein the output unit includes at least one of: (i) a display, (ii) a speaker, (iii) a printer, (iv) a tactile device, and (v) a communication device.

12. The portable communication device of claim 4, wherein the input unit is further adapted to provide at least some information.

13. The portable communication device of claim 4, wherein the output unit is further adapted to receive at least some information.

14. The portable communication device of claim 4, wherein a user can activate the input unit to determine information associated with the location of the output unit.

15. The portable communication device of claim 4, wherein a user can activate the output unit to determine information associated with the location of the input unit.

16. The portable communication device of claim 4, further comprising:
   a charging device adapted to charge power devices in both the input unit and the output unit.

17. The portable communication device of claim 4, further comprising:
   a docking device adapted to exchange information between the portable communication device and another computing device.

18. A portable digital assistant, comprising:

a keypad unit including a first power device and a first coupling portion;

a display unit including a second power device and a second coupling portion, wherein the first and second coupling portions include a joint adapted such that the display unit is: (i) positionable with respect to the keypad unit, and (ii) rotatable about a first axis, a second axis, and a third axis, and further wherein the display unit is selectively removable from the keypad unit, and the keypad unit and the display unit communicate wirelessly when connected to each other and when removed from each other; and a charging device coupled to one of the keypad unit and the display unit and adapted to charge the first and second power devices.

* * * * *